United States Patent
Lintner

(10) Patent No.: US 9,420,104 B1
(45) Date of Patent: Aug. 16, 2016

(54) SYSTEMS AND METHODS FOR AN OMNI-CHANNEL ROUTING BROKER

(71) Applicant: salesforce.com, inc., San Francisco, CA (US)

(72) Inventor: Andrew Lintner, Royal Oak, MI (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 14/829,347

(22) Filed: Aug. 18, 2015

(51) Int. Cl.
*H04M 3/00* (2006.01)
*H04M 5/00* (2006.01)
*H04M 3/51* (2006.01)
*H04L 29/08* (2006.01)
*G06Q 30/00* (2012.01)
*H04M 3/523* (2006.01)

(52) U.S. Cl.
CPC ............ *H04M 3/5191* (2013.01); *G06Q 30/016* (2013.01); *H04L 67/10* (2013.01); *H04L 67/24* (2013.01); *H04M 3/5232* (2013.01)

(58) Field of Classification Search
CPC .............. H04M 3/5191; H04M 3/523; H04M 2203/408; H04M 3/5232; H04M 3/51; H04M 3/5175
USPC ............... 379/265.09, 265.05, 265.1, 265.11, 379/266.01, 265.01, 266.08, 266.06, 265.14
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |

(Continued)

OTHER PUBLICATIONS

Sesum-Cavic, "Applying Swarm Intelligence Algorithms for Dynamic Load Balancing to a Cloud Based Call Center," Self-Adaptive and Self-Organizing Systems (SASO), 2010 4th IEEE International Conference, 2010, <http://ieeexplore.ieee.org/xpl/login.jsp?tp=&arnumber=5630066&url=http%3A%2F%2Fieeexplore.ieee.org%2Fxpls%2Fabs_all.jsp%3Farnumber%3D5630066>, retrieved Jul. 1, 2015, pp. 2.

(Continued)

*Primary Examiner* — Thjuan K Addy
(74) *Attorney, Agent, or Firm* — Haynes Beffel & Wolfeld LLP; Ernest J. Beffel, Jr.

(57) ABSTRACT

Omni-channel routing broker technology is usable to improve the experience for customers and for workers using service channels, especially for very large enterprise service operation centers that have large pools of agents, helping businesses determine the relative priority for handling a variety of service channels, and to efficiently route issues accordingly. Omni-channel routing broker includes intelligent routing of service requests in a large, distributed service center operation, efficiently prioritizing the routing of work across organizations to agents based on availability, capacity and priority—in a multi-tenant environment. The disclosed methods are usable for managing digital data for many tenants to software instances, including groups of users who share common access with a specific set of privileges to a software instance of at least one application. The disclosed technology makes possible the delivery of an improved performance from routing 3-4 requests per second to routing 100 requests per second.

25 Claims, 6 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 7,899,177 B1 | 3/2011 | Bruening et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,295,471 B2 | 10/2012 | Spottiswoode et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 8,867,733 B1 * | 10/2014 | Conway ............... H04M 3/5233 379/265.09 |
| 9,160,858 B2 * | 10/2015 | Khouri ................ H04M 3/5232 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0247216 A1 | 9/2013 | Cinarkaya et al. |

OTHER PUBLICATIONS

"ZooKeeper—A Distributed Coordination Service for Distributed Applications," The Apache Software Foundation, 2008, p. 1-10.

Salesforce, "Integration Patterns and Practices—Version 34.0, Summer '15," @salesforcedocs, 2015, pp. 53.

Salesforce, "Database," Salesforce.com Help Portal (//help.salesforce.com/), 2015, <https://developer.salesforce.com/page/Database>, retrieved, Jun. 30, 2015, pp. 5.

* cited by examiner

FIG. 1 Environment

FIG. 2 Brokered Routing

FIG. 3

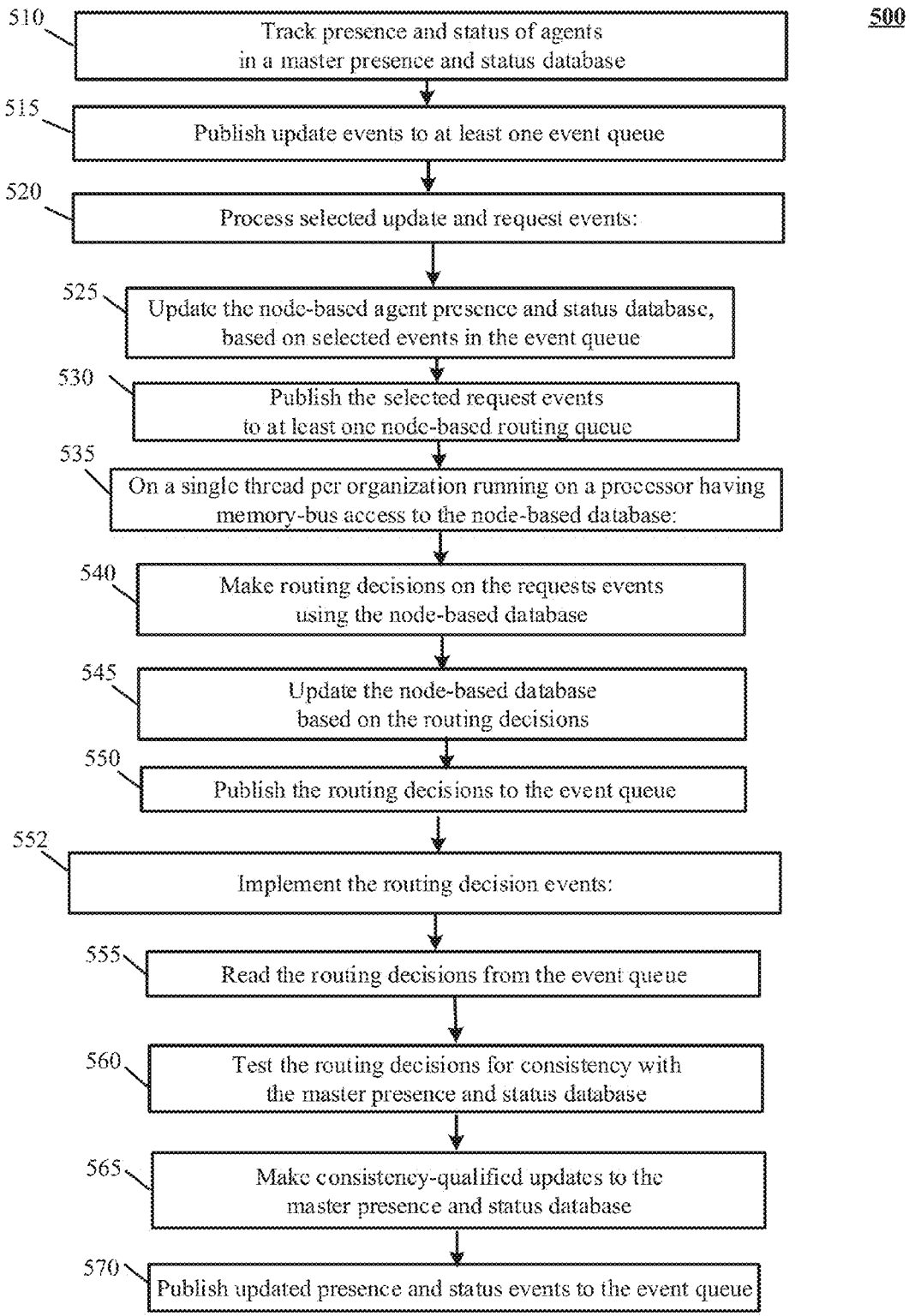
FIG. 5 Omni-channel Routing Workflow

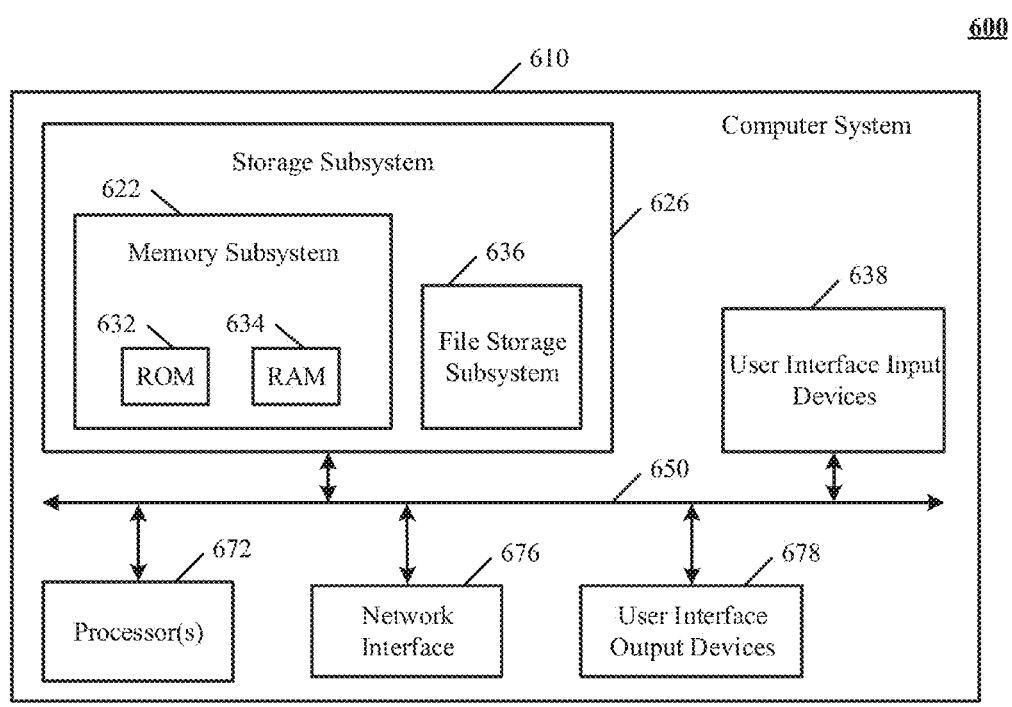
FIG. 6 Computer System

SYSTEMS AND METHODS FOR AN OMNI-CHANNEL ROUTING BROKER

FIELD OF DISCLOSURE

The technology disclosed describes systems and methods for intelligent routing of service requests in a large, distributed service center operation—efficiently prioritizing the routing of work across organizations to agents based on availability, capacity and priority, in a multi-tenant environment. The methods disclosed include managing digital data for a plurality of tenants to software instances, each tenant of the plurality of tenants comprising a group of users who share a common access with a specific set of privileges to a software instance of at least one application.

The technology discloses systems and methods for an omni-channel routing broker.

INTRODUCTION

Customer service is moving toward a more personalized 1:1 communication with consumers, through the many channels and on the many devices they use. Omni-channel is a multichannel approach for providing customers with a seamless experience, whether the customer is interacting online via email, web, short message service (SMS), chat, or live agent video support on a desktop or mobile device, by telephone, or in a brick and mortar store.

Historically, a series of requests for services have been stored in a database, as an event sequence—a queue of available work. Common techniques for routing work from the queue to agents include the following options: either agents pull work from the queue and assign it to themselves, or a supervisor assigns work to agents. Given that companies have extensive information about their agents—their capabilities, the amount of work that is waiting, and how much work the agents already have in their queues—one goal is to intelligently route work to the agents. Methods of prioritizing include either 'most available agent': determining which agent is most available, based on a difference between their capacity and the amount of work already in the agent's queue; and 'least active agent': prioritizing routing of work to an agent based purely on how much work an agent already has. Note that two agents can have different capacity amplitudes, based on various factors, such as number of work hours per week, amount of work experience, or level of training.

Service channels for contact centers are evolving significantly for organizations. In this era of omni-channel, it is important for a business to determine the relative priority for handling a variety of service channels, and to efficiently route issues accordingly.

In a multi-tenant environment, agents are potentially connected to different app servers, generating a need for keeping work queues synchronized. In order to select a preferred agent to receive any given piece of work, the system needs to evaluate the availability of the agents in the org, their queue membership, their current workload, and the priority of the work. Making these selections in a multi-tenant environment with a high load of incoming work is difficult due to the concurrent nature of the updates made to the variables used to perform agent selection and the distributed system that handles these requests. For example, for a routing system that searches to identify the agent with the least amount of current work, if two work request cases are pushed into a queue simultaneously, and we make routing decisions on two different app servers, then we could potentially push both pieces of work to the same agent, leaving that agent over-burdened.

Increasing bandwidth issues accompany routing requests across app servers, and synchronizing access to shared resources is a challenging problem that has relatively slow solutions, with limitations on throughput. Existing technology solves the limitation by segmenting contact centers, but a new approach is needed to allow very large scale service organizations to utilize a very large pool of agents. Some approaches break up distributed systems entirely, but with traffic served by a single app server with agents in an org connected to it, the size of the app server becomes a limiting factor.

Speed and efficiency are two of the biggest drivers for customer service departments. The disclosed technology delivers an improved performance from routing 3-4 requests per second to routing 100 requests per second.

An opportunity arises to improve the experience for customers and for workers using disclosed omni-channel routing broker technology, including making it feasible for very large enterprise service operation centers to have very large pools of agents.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 3 illustrates a user interface for an open lead interface, with an agent status window.

FIG. 5 shows an example omni-channel routing broker workflow.

FIG. 6 is a block diagram of an example computer system for implementing an omni-channel routing broker.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

In one implementation, an omni-channel routing broker system includes selecting an app server among the cluster of app servers (pod) to perform routing for a given org. Event handling results are stored in a database, to fulfill a requirement of many large organizations for recording permanent and highly available event logs that enable event tracking, agent activity tracking, and performance analysis.

A cascading series of queues is used to avoid the reduction in throughput that would occur if the orgs were routed via a single thread in a single app server. The disclosed system separates routing decisions from the work required to commit routing decisions, delivering improved routing performance and service for customers.

Routine Broker Environment

Figure 1:
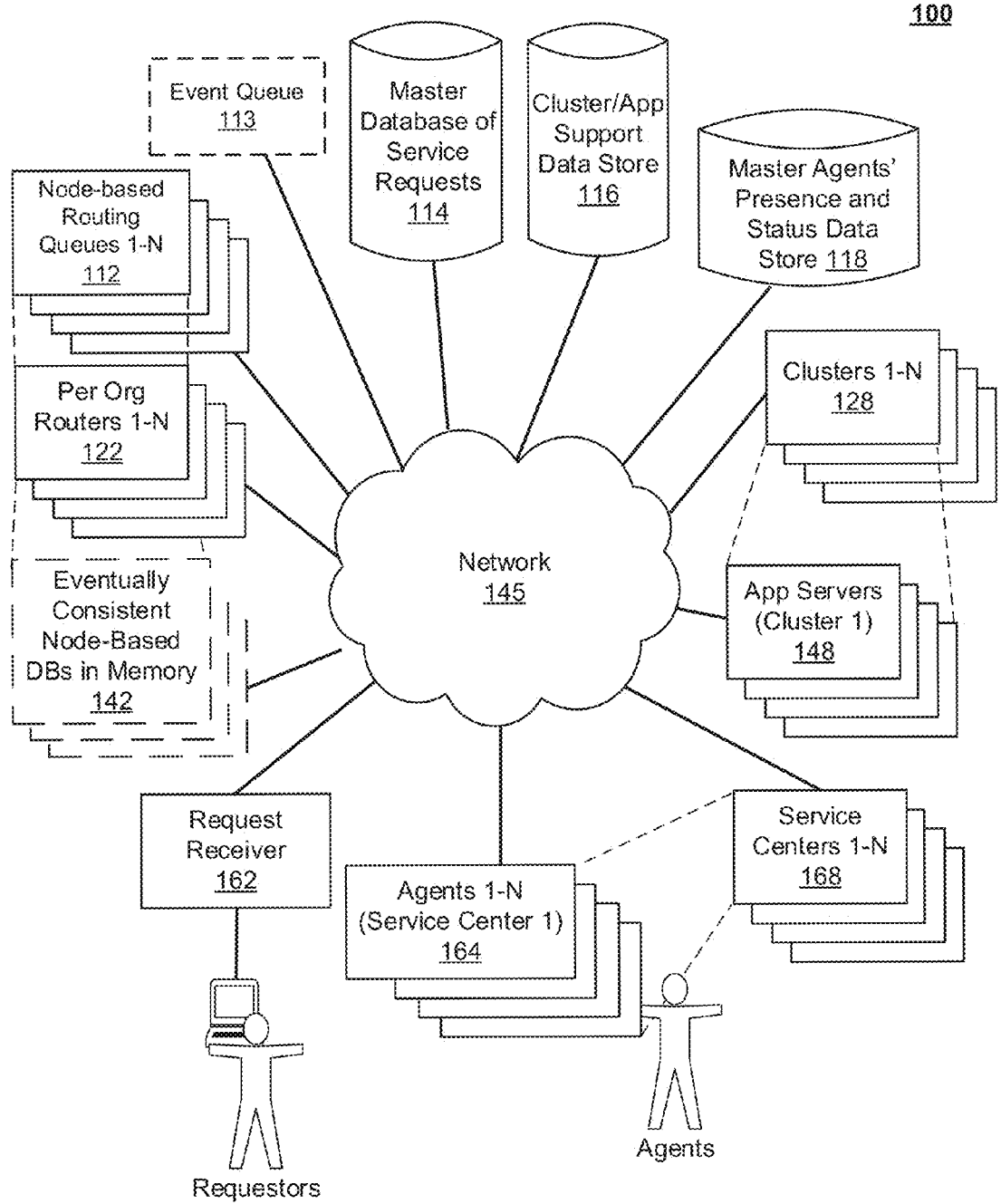
FIG. 1 illustrates one example implementation of an omni-channel routing broker environment.

FIG. 1 illustrates an example omni-channel routing broker environment 100 that includes a request receiver 162 for handling service requests from a plurality of organizations, via multiple sources: for example—email, web, SMS, chat, or live agent video support on a desktop or mobile device, or by telephone. Each organization has an agent pool disjoint from the agent pools of other organizations. Agents 1-N 164, at service center one, complete work requests received at service centers 1-N 168. Clusters of app servers 148 serve org clusters 1-N 128, storing event information and other log data in cluster/app support data store 116. In some implementations, organizations operate on a single pod. Clusters of servers that handle traffic exist as a logical unit sometimes referred to as a "superpod" which is a group of pods.

An app server among the cluster of app servers 148 is elected to perform routing for a given org. That app server will make the routing decisions for the org. A system could have a single app server for a hundred different orgs. That is, a given app server can serve many orgs. Each org has one or more work queues for their organization's agent pool. Cluster/app support data store 116 gets updated when agents complete tasks (i.e. close work) for their organizations.

Omni-channel routing broker environment 100 makes use of multithreading to manage requests from more than one user at a time, and to manage multiple requests by the same user-tracking the presence and status of agents for multiple orgs. Current presence and status for each agent is stored in master agents' presence and status data store 118, and presence and status update events are published to event queue 113.

Omni-channel routing broker environment 100 in FIG. 1 also includes eventually consistent, in-memory node-based databases 142, which get updated based on the results of receiving agent presence and status events from event queue 113. For eventually consistent databases, changes to a replicated piece of data eventually reach the affected replicas. The master presence and status data store 118 can store agent presence and status data across agent pools serving multiple nodes; and the eventually consistent in memory node-based databases 142—are subsets of the master presence and status database that is eventually consistent with the master presence and status data store 118, as a result of processing events from the event queue.

Per org routers 1-N 122 publish incoming service request events from the event queue 113 to at least one of the node-based routing queues 1-N 112. Additionally, routing broker environment 100 includes a master database of service requests 114 that provides a permanent record of events, enabling long-term event tracking and agent performance analysis.

In other implementations, environment 100 may not have the same elements as those listed above and/or may have other/different elements instead of, or in addition to, those listed above.

The disclosed omni-channel routing broker technology, described in detail below, evaluates presence and status for agents, and makes routing selections in a multi-tenant environment that handles a high volume of incoming work.

Figure 2:
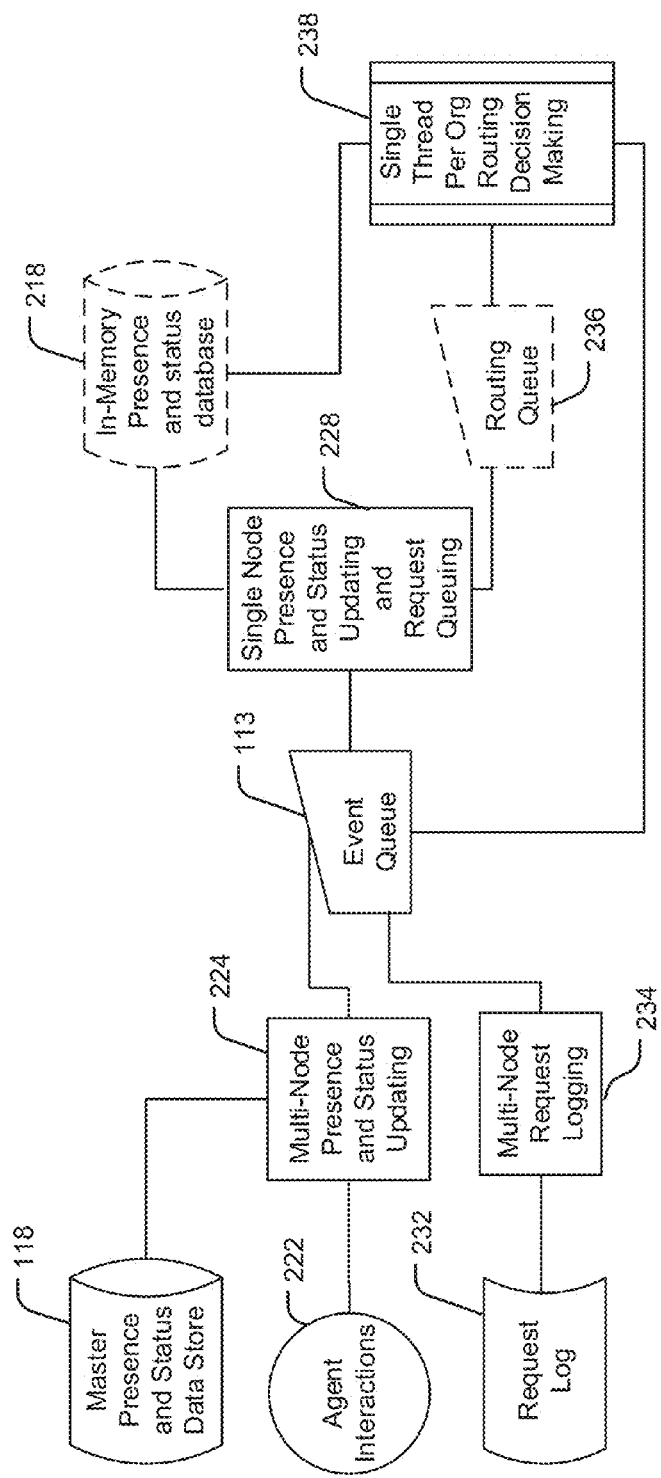
FIG. 2 shows a brokered routing example.

FIG. 2 shows an example brokered routing system. Master presence and status data store 118 includes data that specifies the availability and capabilities of each agent. In one example in which agents service sales leads for an organization, an agent's status can include a list of cases in the agent's queue, an indicator showing availability for a live chat, and a list of leads being pursued by the agent. Availability can be disabled or dimmed when the agent selects a lunch or offline setting. Agent interactions 222 can include logging in, logging out, completing a task, changing their status such as 'lunch' or 'available for work', accepting work or closing work, new work coming in, or a new case created. Request log 232 stores the service requests generated via multi-node request logging 234.

When an event comes from one of multiple threads on an app server, the event gets passed to a pool of listeners that processes the event and determines relevance, makes decisions, and adds a routing request to request log 232, as appropriate. Some events do not cause the addition of a routing request—such as events for orgs not of interest to the stream—because they require no routing decision. Events of interest include an agent doing something that changes their availability for work such as logging in; changing an agent's capacity for work such as closing work, etc.; or the addition of a new work request.

A service request event for an org can be stimulated by an agent requesting work, or by a service request being routed to push work to an agent. An example class for routing work from a pull request is shown below. The code identifies which queue has the most eligible piece of work to route for an agent based on priority and time in queue, and routes the pulled work to the agent.

```
class PullRouter extends AbstractRunner {
    <...>
    public void route(PullRequest request) {
        RoutableBrokeredAgent agent = request.getAgent( );
        while (agent.hasCapacity( )) {
            //Evaluate queue priorities and other business rules to identify the highest priority work
            RoutingResult work = queueRouter.findBestWorkForAgent(agent);
            if (work != null) {
                //Attempt to route the work and make changes to our local state.
                // Note: The actual changes to the data store will be committed
                    asynchronously. Success here only indicates success
                // of the initial attempt.
                if (routeToAgent(agent, work, request, routeRequestHandler)) {
                    logSuccessfulRoute(agent, work);
                }
            } else {
                //There was no work to route, exit the loop
                break;
            }
        }
    }
    private boolean routeToAgent(RoutableBrokeredAgent agent,
RoutingResult work, RoutingRequest request, RouteRequestHandler
routeRequestHandler) {
        //Remove the pendingServiceRouting object from our local state
        QueuedPsr psr =
routeRequestHandler.getQueuesState( ).take(work.getWinningItem( ));
        if (psr != null) { //If there was concurrent modification and we lost
this, it's okay - we'll come through on the next loop
        QueueId queueId = work.getWinningQueue( ).getQueueId( );
        long capacityImpact = agent.getQueueManager( ).getIm-
pact(queueId);
        // Update the local agent state to remove capacity for this pending
work. We'll later commit this or roll it back.
        agent.getWorkManager( ).consumePending(capacityImpact);
        try {
            // Enqueue the routing result to be processed asynchronously
            routeRequestHandler.addRoutingResult(agent, queueId, psr,
capacityImpact);
            return true;
        } catch (Exception e) {
            logException(e);
            agent.getWorkManager( ).restorePending(capacityImpact);
//Rollback the capacity impact
            routeRequestHandler.addAll(Collections.singleton(request));
```

```
         //Add the routing request back to the queue to be retried later
              }
           }
           return false;
        }
     }
```

An implementation of handling a routing result from the org's router is shown in the code snippet listed below. If a problem is encountered during the routing, then the work gets restored to the queue, and the pending agent's capacity gets restored. In one case, if the work is unavailable due to a concurrent modification, the agent's capacity gets restored. In another case, if the agent concurrently modifies their status to one that should not receive this work, the agent's capacity gets restored. In both cases, the routing request gets added back to the queue to be retried later. Alternatively, if the routing conditions are successfully met, then the route success marker gets activated.

```
public class RoutingResultHandler {
    <...>
    public void handleRoutingResult(RoutingRequest request,
RoutingResult result) {
        CompletableFuture<WorkRoutedResponse> responseFuture =
executeCustomerValidation(result)
            .exceptionally((exception) ->
WorkRoutedResponse.failedExecution(exception))
            .thenApplyAsync(commitToDataStore( ))
            .exceptionally((exception) ->
WorkRoutedResponse.failedExecution(exception))
            .thenApplyAsync(commitToSharedState( ))
            .exceptionally((exception) -> rollbackDataStoreChange(excep-
tion))
            .thenAcceptAsync((response) -> {
                if (response.failedExceptionally( )) {
                    resyncLocalState( ); //Something has become out of sync in an
unexpected way. Re-sync the local state from the shared state.
                    return;
                }
                if (response.result == WORK_UNAVAILABLE) {
                    //The work was unavailable due to a concurrent modification.
Restore the agent's capacity and move on
result.getAgent( ).getWorkManager( ).restorePending(result.getCapacityIm-
pact( ));
                } else if (response.result == WRONG_AGENT_STATUS) {
                    //The agent concurrently modified their status to one that
should not receive this work.
                    // Restore the agent's capacity and put the work back in the
queue result.getAgent( ).getWorkManager( ).restorePending(result.getCa-
pacityImpact( )); //Rollback the capacity impact
                    routeRequestHandler.addAll(Collections.singleton(request));
//Add the routing request back to the queue to be retried later
                } else {
                    publish WorkRoutedEvent( );
                }
            });
    }
}
```

Routers may not be constantly running. If a routing request is the first one in the queue for the particular organization, a router spin-up request event is generated, which causes spin-up of a router for a particular org. Per org routing requests are handled in a non-blocking fashion using the in-memory state snapshot, in order to quickly return the thread for further processing.

Multi-node presence and status updating 224 captures changes in agents' states, such as the completion of a task, and provides the changes to the event queue 113.

In one implementation of the disclosed system, a single router per org runs at any snapshot in time. An advantage of this single-router-per-org approach is the ability to route events serially. Single node presence and status updating and request queuing 228 updates an eventually consistent, in-memory subset of the master agent presence and status database 218 and at least one in-memory node-based routing queue 236. Single thread per org routing decision making 238 includes receiving incoming service requests from the node-based routing queue 236; and making routing decisions on the incoming service requests using the in-memory subset of the master agent presence and status database 218. The eventually consistent, in-memory subset of the master agent presence and status database 218 gets updated to reflect the routing decisions; and the routing decisions get published to the event queue 113.

Implementing the routing decisions applicable to the agent pools across the multiple nodes includes receiving routing decisions from the event queue 113, and testing the routing decisions for consistency with the master agent presence and status data store 118. Confirming consistency includes looking at the in-memory node-based routing queue 236 and in-memory presence and status database 218, and determining whether to roll back the route or to commit the route, based on whether the master presence and status data store 118 is consistent with in-memory node-based routing queue 236. Consistency-qualified updates are made to the master agent presence and status data store 118 and updated status events are published to event queue 113.

For some implementations, validation rules provided by an organization affect which of the decisions made during single node presence and status updating and request queuing 228 get applied to routing work, via service requests, to agents. Customer code can include Apex triggers or validation rules that affect the ultimate routing decision. For example, some organizations implement rules for fulfillment of customer orders and for processing claims made relative to customers' orders: 'manager' level permissions may be required for an agent who approves service requests that include refunds for customers.

Once the routing decision has been made; results are stored in the master presence and status data store 118; customer code has been executed successfully; and consistency has been confirmed, then the route is considered committed. The service request routing the work to that agent is posted to the event stream, and the agent receives notification that they have work. The agent 'listening' to the event stream learns that they have work.

In the case of lack of consistency between a particular routing decision and the master presence and status data store 118, a routing decision rollback event is published to the event queue 113, and the particular routing decision is not applied to the master presence and status data store 118. The node-based database—the in-memory presence and status database 218—gets updated to roll back the routing decision. That is, if unsuccessful, the state changes are rolled back and the work is made available for another routing attempt. For example, if an agent has gone offline during the routing of the request, then we learn that the agent is not available when we try to commit the route to the database, so the route will be rolled back as though it never happened and a new routing request will be generated.

App servers within a cluster keep a connection open to each other and ping periodically to be sure they are "up". In one implementation, if an app server drops out of the pool, the remaining distributed processes coordinate with each other and elect a new app server to serve that org as router. That is, app server selection can be updated if cluster members change over time. A new leader can be elected if the app server that runs the routing decision maker goes offline.

A distributed commit log can handle hundreds of megabytes of reads and writes per second from thousands of clients. In one example implementation, a single Apache Kafka broker can allow a single cluster to serve as the central data backbone for a large enterprise organization. The commit log can be elastically and transparently expanded without downtime. Data streams can be partitioned and spread over a cluster of machines to allow data streams larger than the capability of any single machine and to allow clusters of coordinated consumers.

Figure 3:
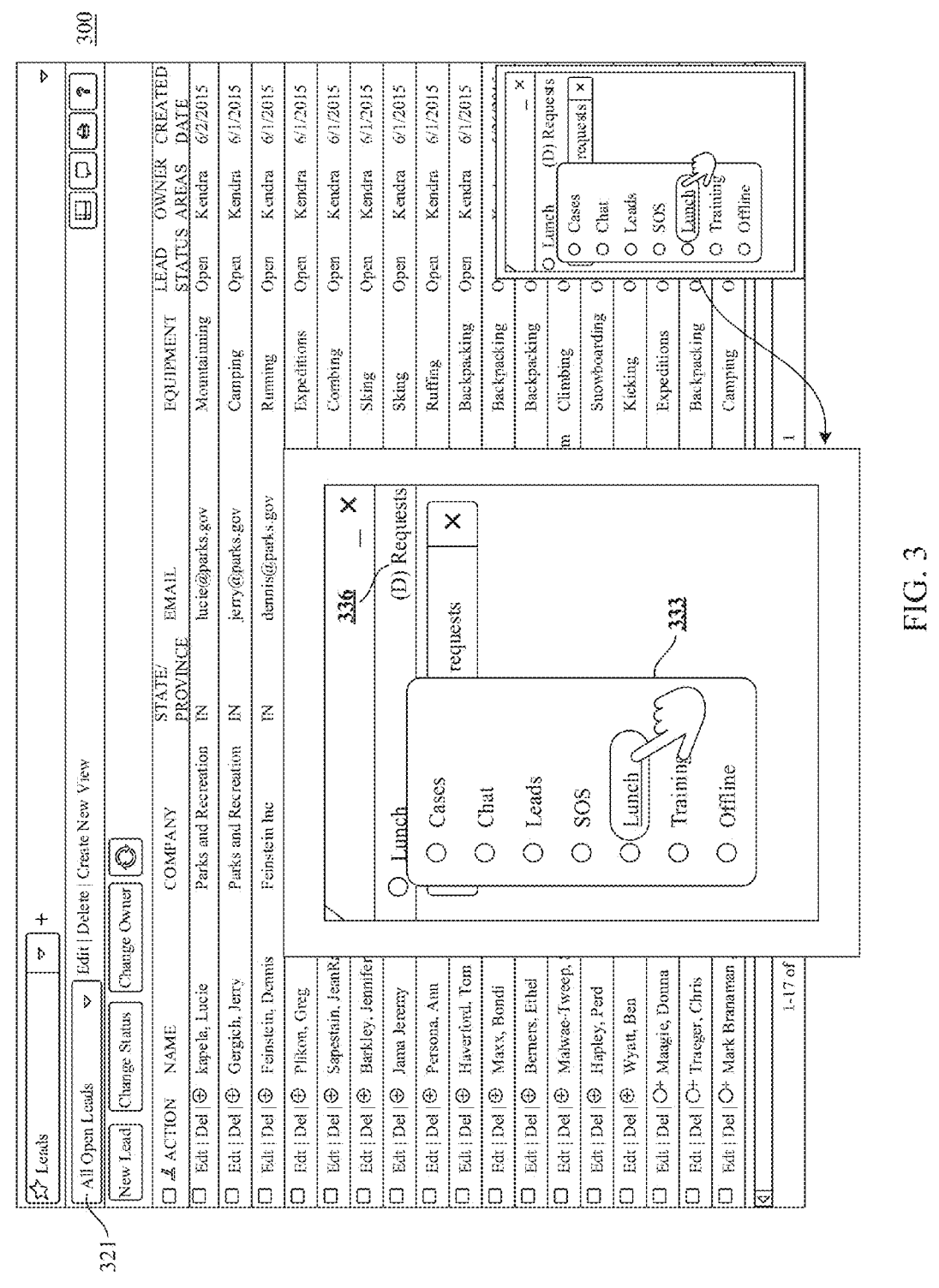

An example user interface for a multi-tenant, multi-threaded omni-channel routing broker system is shown in FIG. 3. The screenshot shows a webpage that an agent accepting work might view, of Leads known to the organization. In this case, open leads 321 are listed. Also, a zoom in of an agent options popup, located in the bottom right corner of the page, shows agent options 333. As discussed earlier in this application, cases, chat leads, SOS (for mobile device support), lunch, training and offline are options available to the agent. When a service request has been successfully pushed to the agent, the requests count will show the addition of a new request 336. Agents can also set their availability to receive work and view incoming requests; and can choose to accept or decline work based on setup for the org, when the widget flashes or rings.

Figure 4:
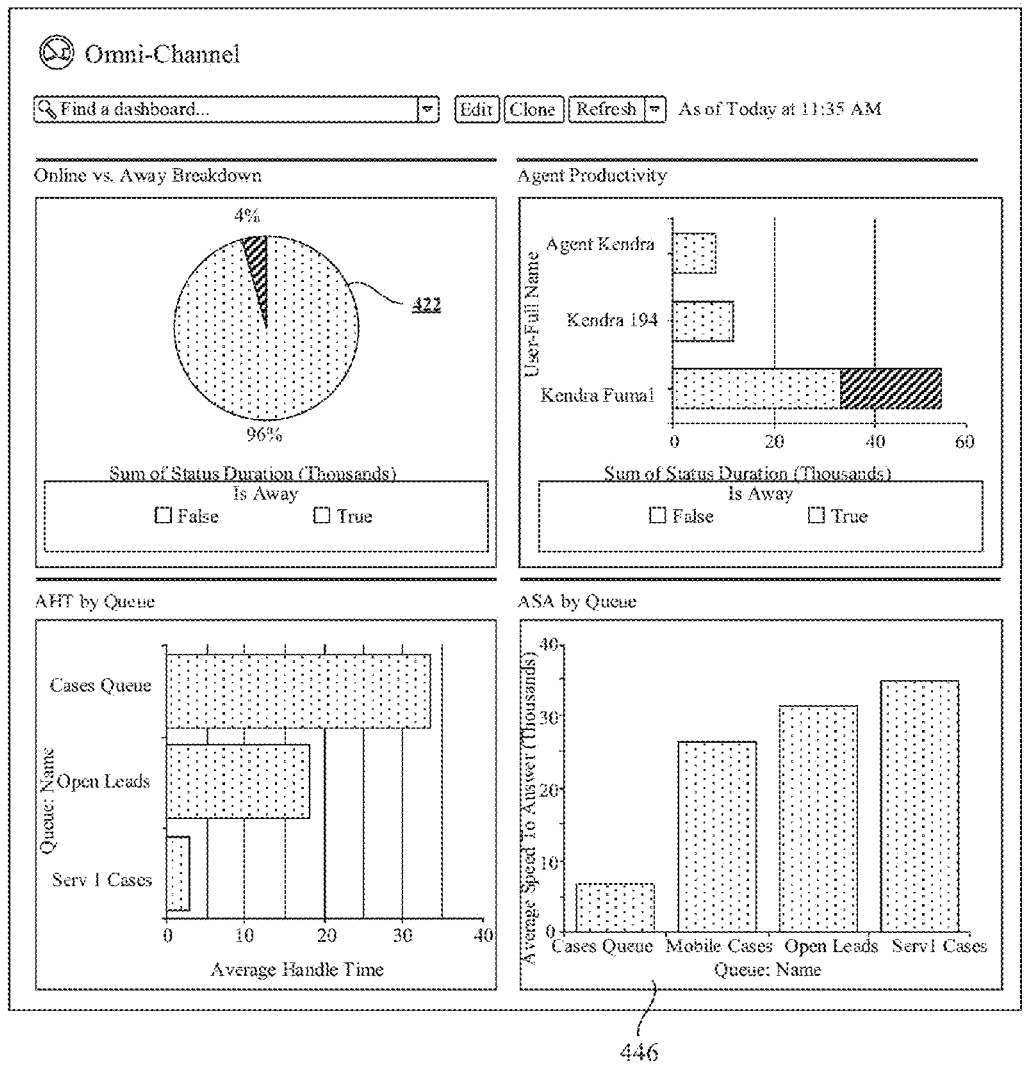
FIG. 4 shows an example user interface that displays agents' work history.

FIG. 4 shows an example user interface, for data reporting and analysis, that displays the results of an agent's work over time. Data can be gleaned from the master agents' presence and status data store 118, and from the request log 232 and productivity can be displayed. In this example UI, online versus away breakdown 422 displays the agent's data: the agent was away 4% of the time (based on a sum of status durations in thousands). Average speed of answer (ASA) by queue 446 shows average speed to answer for a cases queue, mobile cases, open leads and sev 1 cases.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

Omni-Channel Routine Broker Workflow

FIG. 5 shows an example workflow 500 of one implementation of an omni-channel routing broker—routing service requests in a large, distributed service center, across multiple nodes having disjoint memory spaces. Workflow 500 can be implemented at least partially with a database system, e.g., by one or more processors configured to receive or retrieve information, process the information, store results, and transmit the results. Other implementations may perform the steps in different orders and/or with different, fewer or additional steps than the ones illustrated in FIG. 5. Multiple steps can be combined in some implementations.

At action 510, track the presence and status of agents in a plurality of disjoint agent pools. At action 515, publish update events to at least one event queue.

At action 520, process selected update and request events, as described in actions 525 through 550.

At action 525, update the node-based database from the selected update events; and at action 530, publish the selected request events to at least one node-based routing queue.

At action 535, on a single thread per organization running on a processor having memory-bus access to the node-based database: make routing decisions on the requests events using the node-based database and at action 540, update the node-based database accordingly. At action 545, publish routing decision events to the event queue.

At action 552, implement the routing decision events: at action 555, test the routing decision events for consistency with a master agent presence and status database; and at action 555, make consistency-qualified updates to the master agent presence and status database. At action 570, publish the consistency-qualified update events.

Computer System

FIG. 6 is a block diagram of an example computer system 600 for implementing an omni-channel broker. FIG. 6 is a block diagram of an example computer system, according to one implementation. The processor can be an ASIC or RISC processor. It can be an FPGA or other logic or gate array. It can include graphic processing unit (GPU) resources. Computer system 610 typically includes at least one processor 672 that communicates with a number of peripheral devices via bus subsystem 650. These peripheral devices may include a storage subsystem 624 including, for example, memory devices and a file storage subsystem, user interface input devices 638, user interface output devices 676, and a network interface subsystem 674. The input and output devices allow user interaction with computer system 610. Network interface subsystem 674 provides an interface to outside networks, including an interface to corresponding interface devices in other computer systems.

User interface input devices 638 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include the possible types of devices and ways to input information into computer system 610.

User interface output devices 676 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include the possible types of devices and ways to output information from computer system 610 to the user or to another machine or computer system.

Storage subsystem 624 stores programming and data constructs that provide the functionality of some or all of the methods described herein. This software is generally executed by processor 672 alone or in combination with other processors.

Memory 622 used in the storage subsystem can include a number of memories including a main random access memory (RAM) 634 for storage of instructions and data during program execution and a read only memory (ROM) 632 in which fixed instructions are stored. A file storage subsystem 636 can provide persistent storage for program and data files, and may include a hard disk drive, a floppy disk drive along with associated removable media, a CD-ROM drive, an optical drive, or removable media cartridges. The software used to implement the functionality of certain systems may be stored by file storage subsystem 636 in the storage subsystem 624, or in other machines accessible by the processor.

Bus subsystem 650 provides a mechanism for letting the various components and subsystems of computer system 610 communicate with each other as intended. Although bus subsystem 650 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as one example. Many other configurations of computer system 610 are possible having more or fewer components than the computer system depicted in FIG. 6.

Particular Implementations

In one implementation, a method of routing service requests in a large, distributed service center includes, across multiple nodes having disjoint memory spaces, tracking presence and status of agents in a plurality of disjoint agent pools and publishing update events to at least one event queue. The method also includes processing selected update and request events, including updating the node-based database from the selected update events, and publishing the selected request events to at least one node-based routing queue, across one or more processors that have access to a node-based database used to track agent presence and status in one or more disjoint agent pools. The method further includes making routing decisions on the requests events using the node-based database and updating the node-based database accordingly; and publishing routing decision events to the event queue—on a single thread per organization running on a processor having memory-bus access to the node-based database. The method additionally includes implementing the routing decision events, including testing the routing decision events for consistency with a master agent presence and status database; and making consistency-qualified updates to the master agent presence and status database and publishing update events accordingly.

In some implementations of the method of routing service requests in a large distributed service center, the master presence and status database stores agent presence and status data across agent pools serving the multiple nodes; and the node-based database is a subset of the master presence and status database that is eventually consistent with the master presence and status database as a result of processing events from the event queue. The method further includes processing the selected update and request events from the event queue; and on the single thread per organization, reading service request events from the node-based routing queue.

In one implementation, a method of routing service requests in a large, distributed service center applies to managing digital data for a plurality of tenants to software instances, each tenant of the plurality of tenants comprising a group of users who share a common access with a specific set of privileges to a software instance of at least one application, wherein each tenant includes one or more of the organizations.

In some implementations, the method is enhanced by further including the distributed service center handling service requests for a plurality of organizations, each organization having an agent pool disjoint from agent pools of other organizations, and having one or more work queues for the organization's disjoint agent pool.

The method further includes tracking the presence and status of agents in the master presence and status database using multiple threads per node on the multiple nodes; and updating the node-based database and publishing to the node-based routing queue using multiple threads.

The method additionally includes, in case of lack of consistency between a particular routing decision and the master presence and status database: publishing a routing decision rollback event to the event queue and not applying the particular routing decision to the master presence and status database; and updating the node-based database to roll back the routing decision.

In some implementations of the method of routing service requests in a large distributed service center, the agent pool serving the organization includes agents working on a plurality of app servers, the method further including: operating a single thread for routing service requests to the agent pool serving the organization across the plurality of app servers used by the agent pool.

In some implementations, the method is enhanced by further including an agent pool serving the organization that includes agents working on a plurality of app servers, geographically disbursed across pods operating in different data centers, the method further including: operating a single thread for routing service requests to the agent pool serving the organization across the plurality of app servers, geographically disbursed across pods operating in different data centers, used by the agent pool.

Other implementations may include a computer implemented system to perform any of the methods described above, the system including a processor, memory coupled to the processor, and computer instructions loaded into the memory.

Yet another implementation may include a tangible computer readable storage medium including computer program instructions that cause a computer to implement any of the methods described above. The tangible computer readable storage medium does not include transitory signals.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A method of routing of service requests in a large, distributed service center, the method including:
   across multiple nodes having disjoint memory spaces, tracking presence and status of agents in a plurality of disjoint agent pools and publishing update events to at least one event queue;
   across one or more processors that have access to a node-based database used to track agent presence and status in one or more disjoint agent pools, processing selected update and request events, including:
     updating the node-based database from the selected update events; and
     publishing the selected request events to at least one node-based routing queue;
   on a single thread per organization running on a processor having memory-bus access to the node-based database:
     making routing decisions on the request events using the node-based database and updating the node-based database accordingly; and
     publishing routing decision events to the event queue;
   implementing the routing decision events, including:
     testing the routing decision events for consistency with a master agent presence and status database; and making consistency-qualified updates to the master agent presence and status database and publishing update events accordingly.

2. The method of claim 1, wherein:
the master presence and status database stores agent presence and status data across agent pools serving the multiple nodes; and
the node-based database is a subset of the master presence and status database that is eventually consistent with the master presence and status database as a result of processing events from the event queue.

3. The method of claim 1, further including:
processing the selected update and request events from the event queue; and
on the single thread per organization, reading service request events from the node-based routing queue.

4. The method of claim 1, wherein the distributed service center handles service requests for a plurality of organizations, each organization having an agent pool disjoint from agent pools of other organizations, and having one or more work queues for the organization's disjoint agent pool.

5. The method of claim 1, further including:
tracking the presence and status of agents in the master presence and status database using multiple threads per node on the multiple nodes; and
updating the node-based database and publishing to the node-based routing queue using multiple threads.

6. The method of claim 1, further including:
in case of lack of consistency between a particular routing decision and the master presence and status database:
publishing a routing decision rollback event to the event queue and not applying the particular routing decision to the master presence and status database; and
updating the node-based database to roll back the routing decision.

7. The method of claim 1, applied to managing digital data for a plurality of tenants to software instances, each tenant of the plurality of tenants comprising a group of users who share a common access with a specific set of privileges to a software instance of at least one application, wherein each tenant includes one or more of the organizations.

8. The method of claim 1, wherein the agent pool serving the organization includes agents working on a plurality of app servers, the method further including:
operating a single thread for routing service requests to the agent pool serving the organization across the plurality of app servers used by the agent pool.

9. The method of claim 1, wherein the agent pool serving the organization includes agents working on a plurality of app servers, geographically disbursed across pods operating in different data centers, the method further including:
operating a single thread for routing service requests to the agent pool serving the organization across the plurality of app servers, geographically disbursed across pods operating in different data centers, used by the agent pool.

10. A system of routing of service requests in a large, distributed service center, the system including:
a processor, memory coupled to the processor, and computer instructions loaded into the memory that, when executed, cause the processor to implement a process that includes:
across multiple nodes having disjoint memory spaces, tracking presence and status of agents in a plurality of disjoint agent pools and publishing update events to at least one event queue;
across one or more processors that have access to a node-based database used to track agent presence and status in one or more disjoint agent pools, processing selected update and request events, including:
updating the node-based database from the selected update events; and
publishing the selected request events to at least one node-based routing queue;
on a single thread per organization running on a processor having memory-bus access to the node-based database:
making routing decisions on the requests events using the node-based database and updating the node-based database accordingly; and
publishing routing decision events to the event queue;
implementing the routing decision events, including:
testing the routing decision events for consistency with a master agent presence and status database; and
making consistency-qualified updates to the master agent presence and status database and publishing update events accordingly.

11. The system of claim 10, wherein:
the master presence and status database stores agent presence and status data across agent pools serving the multiple nodes; and
the node-based database is a subset of the master presence and status database that is eventually consistent with the master presence and status database as a result of processing events from the event queue.

12. The system of claim 10, further including:
processing the selected update and request events from the event queue; and
on the single thread per organization, reading service request events from the node-based routing queue.

13. The system of claim 10, wherein the distributed service center handles service requests for a plurality of organizations, each organization having an agent pool disjoint from agent pools of other organizations, and having one or more work queues for the organization's disjoint agent pool.

14. The system of claim 10, further including:
tracking the presence and status of agents in the master presence and status database using multiple threads per node on the multiple nodes; and
updating the node-based database and publishing to the node-based routing queue using multiple threads.

15. The system of claim 10, further including:
in case of lack of consistency between a particular routing decision and the master presence and status database:
publishing a routing decision rollback event to the event queue and not applying the particular routing decision to the master presence and status database; and
updating the node-based database to roll back the routing decision.

16. The system of claim 10, applied to managing digital data for a plurality of tenants to software instances, each tenant of the plurality of tenants comprising a group of users who share a common access with a specific set of privileges to a software instance of at least one application, wherein each tenant includes one or more of the organizations.

17. The system of claim 10, wherein the agent pool serving the organization includes agents working on a plurality of app servers, the system further including:
a single thread, for routing service requests to the agent pool serving the organization, operated across the plurality of app servers used by the agent pool.

18. A tangible computer readable storage medium loaded with computer instructions that, when executed, cause a computer system to perform actions that route service requests in a large, distributed service center, the actions including:
  across multiple nodes having disjoint memory spaces, tracking presence and status of agents in a plurality of disjoint agent pools and publishing update events to at least one event queue;
  across one or more processors that have access to a node-based database used to track agent presence and status in one or more disjoint agent pools, processing selected update and request events, including:
    updating the node-based database from the selected update events; and
    publishing the selected request events to at least one node-based routing queue;
  on a single thread per organization running on a processor having memory-bus access to the node-based database:
    making routing decisions on the requests events using the node-based database and updating the node-based database accordingly; and
    publishing routing decision events to the event queue;
  implementing the routing decision events, including:
    testing the routing decision events for consistency with a master agent presence and status database; and
    making consistency-qualified updates to the master agent presence and status database and publishing update events accordingly.

19. A tangible computer readable storage medium of claim 18, wherein:
  the master presence and status database stores agent presence and status data across agent pools serving the multiple nodes; and
  the node-based database is a subset of the master presence and status database that is eventually consistent with the master presence and status database as a result of processing events from the event queue.

20. The tangible computer readable storage medium of claim 18, further including:
  processing the selected update and request events from the event queue; and
  on the single thread per organization, reading service request events from the node-based routing queue.

21. The tangible computer readable storage medium of claim 18, wherein the distributed service center handles service requests for a plurality of organizations, each organization having an agent pool disjoint from agent pools of other organizations, and having one or more work queues for the organization's disjoint agent pool.

22. The tangible computer readable storage medium of claim 18, further including:
  tracking the presence and status of agents in the master presence and status database using multiple threads per node on the multiple nodes; and
  updating the node-based database and publishing to the node-based routing queue using multiple threads.

23. The tangible computer readable storage medium of claim 18, further including:
  in case of lack of consistency between a particular routing decision and the master presence and status database:
    publishing a routing decision rollback event to the event queue and not applying the particular routing decision to the master presence and status database; and
    updating the node-based database to roll back the routing decision.

24. The tangible computer readable storage medium of claim 18, applied to managing digital data for a plurality of tenants to software instances, each tenant of the plurality of tenants comprising a group of users who share a common access with a specific set of privileges to a software instance of at least one application, wherein each tenant includes one or more of the organizations.

25. The tangible computer readable storage medium of claim 18, wherein the agent pool serving the organization includes agents working on a plurality of app servers, geographically disbursed across pods operating in different data centers, the computer readable storage medium further including:
  a single thread operated for routing service requests to the agent pool serving the organization across the plurality of app servers, geographically disbursed across pods operating in different data centers, used by the agent pool.

* * * * *